United States Patent [19]

Butler et al.

[11] 4,054,928
[45] Oct. 18, 1977

[54] LASER OPERATED SCANNING AND PRINTING SYSTEM

[75] Inventors: John Charles Butler, Centerville; Lysle Dwight Cahill; Ernest Warren Drumm, both of Dayton; Arnold Leroy Fife, Jamestown; Vincent James Paul, Jr., Kettering, all of Ohio

[73] Assignee: The Mead Corporation, Dayton, Ohio

[21] Appl. No.: 659,732

[22] Filed: Feb. 20, 1976

[51] Int. Cl.² .............................. H04N 1/28
[52] U.S. Cl. .................... 360/79; 358/283; 358/286; 358/296; 358/298
[58] Field of Search ............ 358/286, 283, 296, 298, 358/297, 300, 302; 360/79

[56] References Cited

U.S. PATENT DOCUMENTS

| | | | |
|---|---|---|---|
| 3,604,846 | 9/1971 | Behane | 358/298 |
| 3,636,251 | 1/1972 | Daly | 358/297 |
| 3,742,129 | 7/1971 | Roberts | 358/283 |
| 3,806,643 | 3/1974 | Russell | 358/302 |
| 3,811,009 | 5/1974 | Fukumoto | 358/302 |
| 3,819,854 | 6/1974 | Kolb | 358/283 |

*Primary Examiner*—Raymond F. Cardillo, Jr.
*Attorney, Agent, or Firm*—Biebel, French & Nauman

[57] ABSTRACT

A scanning and printing system scans and digitizes graphical information for recording on magnetic tape and also prints graphical information previously stored in digital form on a magnetic tape. Scanning and printing is accomplished by directing a laser beam through a pinhole in an aperture plate and thence through a set of optics, which collimate the beam and scan it across the surface of a graphic medium. For operation as a printer the laser beam is addressed by an acousto-optic modulator, which is positioned between the laser and the aperture plate. The acousto-optic modulator causes a shifting of the laser beam in accordance with digitized data trains representing positive and negative areas in an image to be reproduced. The laser beam is normally blanked out by the aperture plate and is periodically shifted by the acoustic-optic modulator for direction through the pinhole.

9 Claims, 4 Drawing Figures

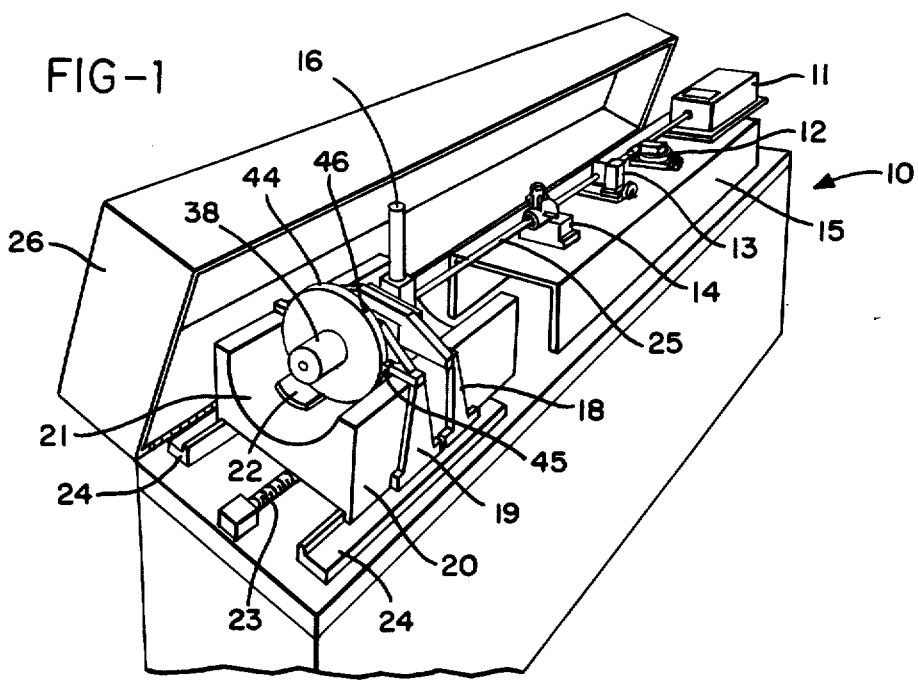
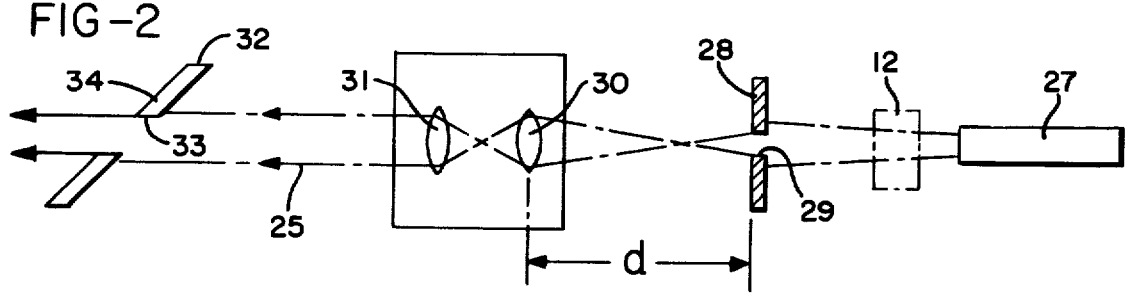
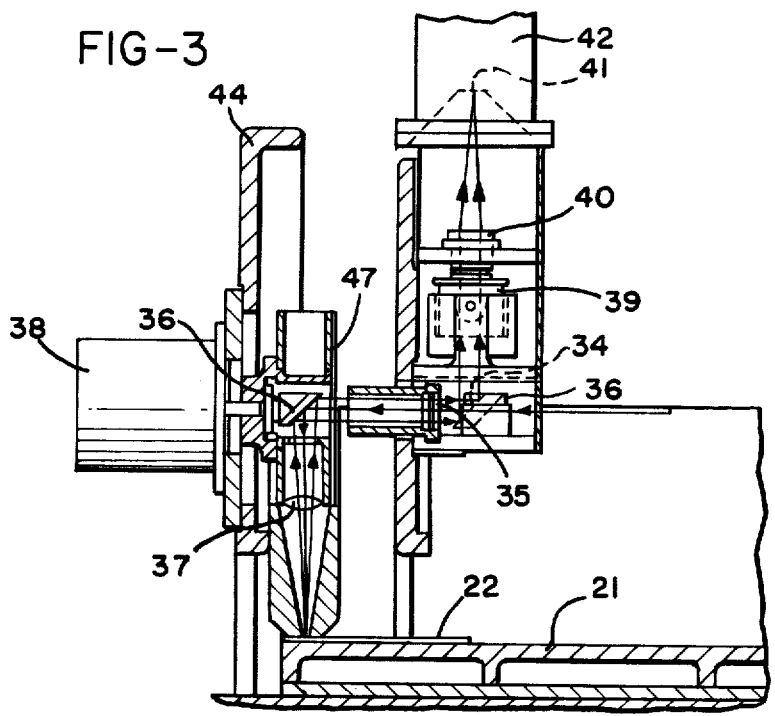

LASER OPERATED SCANNING AND PRINTING SYSTEM

BACKGROUND OF THE INVENTION

This invention relates to digital scanning and printing systems and more particularly to such systems wherein a laser beam is used for scanning and printing. An example of a prior art system of this general type is disclosed in Russell U.S. Pat. No. 3,806,643 wherein digitizing of a laser beam for printing or recording purposes is accomplished by directing the beam through a Kerr cell connected to a source of ON/OFF control signals. There are numerous other prior art recording devices and scanning devices employing lasers for information transfer, and the recorders most commonly amplitude modulate the laser beam, as shown for instance in Johnson U.S. Pat. No. 3,154,371. In the Johnson device the amplitude modulated laser beam is directed repeatedly across a photographic film mounted on a curved platen. Another prior art laser recorder of interest is shown in Fukumoto et al U.S. Pat. No. 3,811,009 wherein a laser beam is amplitude modulated by means of an acousto-optic modulator and a light intercepting member provided with a light passing slit.

Still another prior art laser recording system is disclosed in Daly U.S. Pat. No. 3,636,251. In this system a laser beam is used for engraving printing plates. Daly utilizes a Q-switched laser, which it is pulsed on and off to engrave intaglio cells, which are varied in spacing in accordance with a grey level or optical density being reproduced.

A prior art system utilizing a laser for scanning continuous tone graphic copy and digitizing the grey level is shown in Kolb U.S. Pat. No. 3,819,854. Kolb provides other apparatus for displaying the graphic information so scanned. A prior art system which employs a laser beam for simultaneously scanning original copy and reproducing the copy so scanned is disclosed in Ketley U.S. Pat. No. 3,867,150. Reference may also be made to Lipp U.S. Pat. No. 3,664,737 wherein a laser beam recorder is switched on and off by an electro-optic switch including beam polarizing means and a birefrigent device and to Cottingham et al U.S. Pat. No. 3,389,403 which discloses a laser beam recorder having a magnetic sensor for timing control of the recording process.

SUMMARY OF THE INVENTION

This invention provides an improved printing and scanning system using a laser as an information transfer device. The laser operates continuously, and the laser beam is directed through a pinhole-type aperture in an aperture plate. After passage through the pinhole the beam travels through a set of collimating optics and thence through an optical scanning system which directs the beam in successive scanning lines across the surface of a graphic medium. The pinhole aperture and the collimating optics produce a sharp well defined beam for high resolution and broad grey scale imaging.

For operation as a printer there is provided an acousto-optic modulator, which is positioned between the laser and the aperture plate. The laser beam passes through the acousto-optic modulator and is intermittently deflected in response to intermittently addressed graphic signals applied to the acousto-optic modulator. Whenever the beam is deflected it passes through the pinhole; otherwise it is intercepted by the aperture plate, thereby effectively switching off the beam. The graphic medium, which in this case may be photographic film, is exposed by a series of sharp spots which collectively define an image to be recorded. Various optical densities or grey levels may be reproduced by arranging the recording spots in a dot matrix arrangement.

The graphic medium is mounted on the surface of a semi-cylindrical carriage, and the scanning optics are rotated about an axis colinear with the axis of the cylinder and laser beam. The semi-cylindrical carriage is stepped a distance equal to the width of one scan line for each rotation of the scanning optics. This permits the entire surface of the graphic medium to be scanned.

For operation as a scanner or reader there is provided a photosensing system to collect light reflected from the graphic medium, which for that purpose is a printed original copy. Means are provided for digitizing the output of the photosensing system, and the laser beam is directed continuously through the pinhole in the aperture plate. The system optics are provided with means to filter out specular light reflected from the graphic medium while passing diffuse light which is reflected therefrom. This provides a true readout of all grey levels on the original image.

The means for filtering out the specular light include a quarter wave plate through which both the incident and reflected beams are directed and a filter, preferably a Wollaston prism. The Wollaston prism removes from the reflected beam all linearly polarized light having a predetermined polarization direction. No such polarization exists for the reflected diffuse light, but the specular light is polarized in the predetermined direction as a result of the orientation of the laser and the polarizing action of the quarter wave plate.

There is a magnetic tape unit which carries digitized graphic information for recording on the graphic medium in the printing mode or for recording digitized graphic information as read from the graphic medium during the scanning mode. The system electronics include a memory and other components which are dual purpose in that they are used in both the printing and scanning modes.

It is therefore an object of this invention to provide improved apparatus for printing digitized graphic information.

It is another object of this invention to provide improved apparatus for scanning and reading image information printed on a graphic medium.

Still another object of the invention is to provide improved apparatus for alternatively printing or scanning graphic information using common components and a laser as an information transfer device.

A further object of the invention is to provide an improved optical system for creating, scanning and switching a precise spatially defined beam of light.

Other and further objects of the invention will be apparent from the following description, the accompanying drawings and the appended claims.

BRIEF DESCRIPTION OF THE DRAWINGS

FIG. 1 is a pictorial drawing of a combined printing and scanning system in accordance with this invention;

FIG. 2 is a schematic diagram of a portion of the optical system of FIG. 1;

FIG. 3 is an elevation view in partial cross section illustrating scanning optics in accordance with this invention.

DESCRIPTION OF THE PREFERRED EMBODIMENTS

Figure 4:
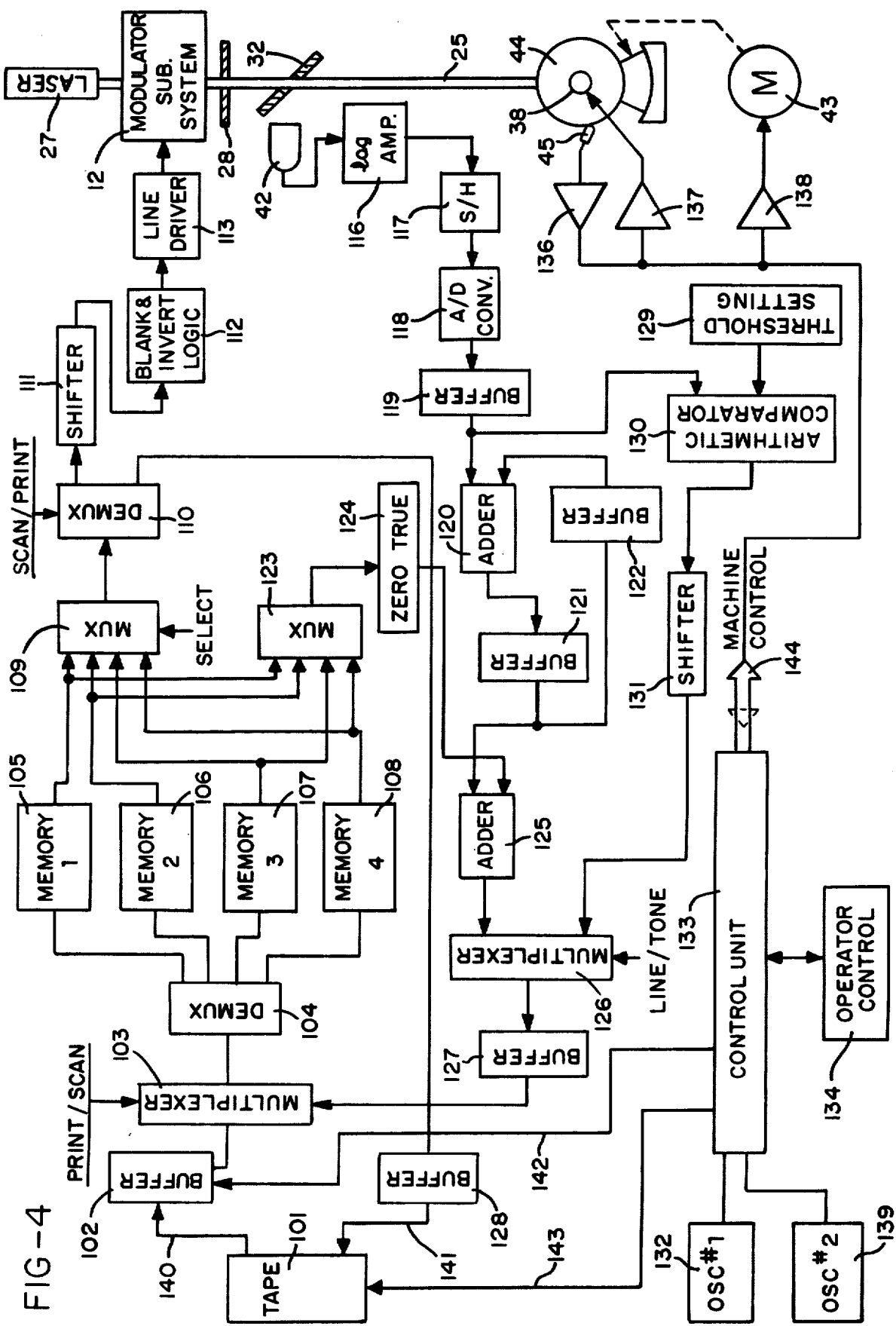
FIG. 4 is a system block diagram illustrating major electrical components and their interrelation with the mechanical portions of a printing and scanning system.

A scanning and recording system 10 illustrated in FIG. 1 incorporates the features of the preferred embodiment of the invention. The system includes a laser assembly 11, demodulator 12, an aperture assembly 13, and focusing optics 14 all mounted on a support frame 15. Laser assembly 11 includes a laser which may be any of numerous commercially available devices. An example of a suitable laser is an argon ion laser operating continuously at a power level of ten milliwatts and at a frequency of 4,800 angstroms.

Modulator 12 is preferably an acousto-optic modulator. Such modulators are readily available in the commercial market, and they deflect a beam of light by utilizing acoustic waves to form an optical phase grating. As utilized in connection with this invention the acousto-optic modulator is operated only to switch a laser beam 25 between an ON position and an OFF position. In general such modulators shift the angle of a beam of light through a range of different values in accordance with the level of an input control signal. A modulator capable of being switched at pulse rates up to seven million pulses per second has been found to be satisfactory.

When modulator 12 switches laser beam 25 to the ON position, the beam passes through aperture assembly 13 and focusing optics 14, as illustrated in FIG. 1, and thence through an optical system which is illustrated in detail in FIG. 3. A portion of the optical system, which includes a photosensing assembly 16, is mounted on a support member 18 secured to a pair of tracks 24. The optical system further includes a scanning assembly 17 mounted on a support member 19, support member 19 also being secured to tracks 24.

A platen 20 having a semi-cylindrical surface 21 is advanced along tracks 24 by a lead screw 23. Lead screw 23 is rotated intermittently by a stepping motor 43, which is illustrated schematically in FIG. 4.

A graphic medium 22, which may be a printed sheet or a recording material such as a photographic film or a thermally responsive material, is mounted on platen surface 21, and is maintained in place by application of a vacuum to a series of small openings (not illustrated) in surface 21. A rotational drive motor 38 rotates scanning assembly 13 about an axis colinear with the axis of curvature for surface 21.

As the scanning assembly rotates, an index mark 46 on the edge of a disc 44 is carried repeatedly past a sensor 45 mounted on support member 19. Lead screw 23 advances platen 20 seven steps for each two rotations of scanning assembly 17, and the timing for this advancement is under the control of sensing signals generated by sensor 45. Three and one-half steps move graphic medium 22 longitudinally for a distance equal to the width of one scanning line. For eliminating the adverse effects of ambient light the entire system may be covered by a cover 26.

FIG. 2 illustrates the operation of a portion of the system optics. As shown in FIG. 2, a laser 27 generates a beam of light 25, which is directed toward a pinhole 29 in an aperture plate 28. Aperture plate 28 is incorporated within aperture assembly 13 and may have a thickness ranging from about 1 mil to 5 mils.

The above described acousto-optic modulator functions in response to control signals to deviate the beam 25 sufficiently to center the beam in pinhole 29. As generated by laser 27 beam 25 is somewhat larger than pinhole 29 and is slightly diverging. Pinhole 29, which may have a diameter in the order of about 16 mils, provides a clear sharp point of light when the acousto-optic modulator directs the laser beam therethrough; aperture plate 28 providing a convenient shuttering device when the laser beam is not so directed.

Focussing optics 14 include a focussing lens 30, and a collimating lens 31 is also illustrated in FIG. 2. Focussing lens 30 is adjusted to be separated from aperture plate 28 by a distance $d$ as illustrated. The adjustment of this distance is important to proper operation of the system optics, and a distance in the order of about 150 millimeters has been found to be satisfactory.

Collimating lens 31 is positioned at the image plane of focussing lens 30 and directs the image of pinhole 29 as a collimated beam of light toward a diagonal mirror 32. Diagonal mirror 32 has a silvered front surface 34 and a center pierced aperture 33. The incident beam of light passes through aperture 33 for focussing on graphic medium 32 as described below. Light which is reflected back from the graphic medium during the scanning mode is reflected upwardly from silvered surface 34 as also described below. If desired for usage with a particular laser, a spatial filter may be positioned between lens 30 and lens 31 at the image plane of lens 30.

Referring now to FIG. 3 it will be seen that the light passing through aperture 33 is directed toward a quarter wave plate 35. The light reaching quarter wave plate 35 is linearly polarized, and the direction of polarization depends upon the angular orientation of laser 27. Upon passage through quarter wave plate 35, the light is circularly polarized. The circularly polarized light is directed via diagonal mirror 36 and focussing lens 37 to a spot on the graphic medium 22. This light is then reflected back from graphic medium 22 and collimated by lens 37. For use as a printer the light reflected back from graphic medium 22 is of no interest. For use as a scanner, however, the reflected light must be directed back to the face 41 of photomultiplier 42, which in turn is part of photosensing assembly 16.

The light reflected back from the surface of a printed surface in general comprises a specular component and a diffuse component. The specular component is a mere glossy reflection, which must be removed. The diffuse component contains the desired grey level or optical density of the various spots being scanned, and the amplitude of this reflected component must be sensed by the reading system.

The specular component is removed by directing the reflected light back through quarter wave plate 35. In general the diffuse component of the reflected light is randomly polarized and is unaffected by the return passage through quarter wave plate 35. However, the specular component of the reflected light is circularly polarized, and quarter wave plate 35 converts this circularly polarized component back to linearly polarized light, the polarization direction being rotated 90 degrees from the polarization direction of the originally incident light beam. The now linearly polarized specular component, together with the randomly polarized diffuse component is reflected upwardly from the silvered surface 34 of diagonal mirror 36.

The light then passes through a polarizing filter 39, which is oriented for passage only of light polarized in a direction transverse to the polarization direction of the specular reflection component. This removes the specular component of the reflected light and directs the diffuse component through a focussing lens 40 and thence toward the surface 41 of photomultiplier 42. Such use of a quarter wave plate and a polarizing filter to eliminate specular reflection is known in the prior art as shown at page 357 of Joseph Morgan's book, "Introduction To Geometrical and Physical Optics", McGraw-Hill Book Company, Inc., 1953.

As further shown in FIG. 3 diagonal mirror 36 and focussing lens 37 are mounted in a lens holder 47, which is rotated together with disc 44 by the drive motor 38. Polarizing filter 39 may be any of numerous available polarizing filters, but a Wollaston prism is preferred. It will be appreciated that lens 37 collimates the light reflected from graphic medium 22 and that lens 40 focusses the light (the diffuse component only) to a sharp point. Thus graphic medium 22 should be located at the image plane of lens 37, and surface 41 of photomultiplier 42 should be located at the image plane of lens 40.

The information handling function of the system is carried out by subsystems as illustrated in block diagram form in FIG. 4. Operation of this system is commenced by depressing a start button (not shown), which activates laser 27 and drive motor 38. Activation of drive motor 38 causes disc 44 to begin spinning, carrying with it lens holder 47 and the optical elements supported thereby. As disc 44 rotates, the sensor 45 begins sensing the index mark 46. The output from sensor 45 is transmitted via an amplifier 136 and a cable 144 to the control unit 133. When control unit 133 senses the correct time interval between pulses from sensor 45, it knows that the system is up to speed. In the preferred embodiment the desired operating speed is six thousand revolutions per minute, and this speed is indicated by a time interval of 10.0 milliseconds between pulses from sensor 45.

When the system is operated as a printer, control unit 133 responds to an operating speed indication by initializing memory addresses and commanding a magnetic tape unit 101 to read out four blocks of data to buffer 102. Line 143 represents the command line to tape unit 101, and line 140 represents the information flow path for reading out of data tape unit 101 to buffer 102. The four blocks of data which are read out from tape unit 101 correspond to eight lines of graphic information in black/white binary form.

Each byte of data supplied to buffer 102 is passed through a multiplexer 103 and then sent to a selected memory by demultiplexer 104. The first block of information is stored in memory 105, the second block in memory 106, the third block in memory 107, and the fourth block in memory 108. Control unit 133 controls the operation of buffer 102 as indicated by line 142.

As further illustrated in FIG. 4 control unit 133 interacts with an operator control panel 134 and is under the control of two master oscillators 132 and 139. Master oscillator 132 preferably operates at a frequency of 8.76 megahertz, and master oscillator 139 preferably operates at a frequency of 11.05 megahertz. When all of memories 105 through 108 have been loaded, control unit 133 activates amplifier 138 to drive stepping motor 43 and commence movement of platen 20. Movement of platen 20 trips a microswitch (not shown) which initiates printing.

The printing operation commences by unloading printing data from memory 105. The data from memory 105 is selected by multiplexer 109 in response to a selection control signal, which may be generated by control unit 133. The printing data so selected by multiplexer 109 passes through demultiplexer 110 to a shifter 111. The data as applied to shifter 111 is in eight-bit parallel form, and the shifter converts this data to serial form. The serial data then passes to the blanking and inversion logic 112, which determines whether the data is valid and inverts the data (i. e. converts black to white and vice versa) if so desired by the operator.

The data is then sent to acousto-optic modulator 12 via line driver 113. 1080 bytes of information representing binary graphic data for one printed line are loaded successively into shifter 111 and serialized. Thereafter the blanking logic blanks laser beam 25 by causing acousto-optic modulator 12 to deflect it toward the blocking surface of aperture plate 28 as above described. Laser beam blanking continues until an output from sensor 45 signals the beginning of a new line.

Upon generation of the next synchronizing pulse by sensor 45, control unit 133 initializes memory 105 at address number 1081 and begins the load and shift operation to print the second line. After the second line has been printed, then multiplexer 109 selects memory 106 to unload data for printing the third and fourth lines of graphic information. While the data for the third and fourth lines are being unloaded from memory 106, memory 105 is loaded with a new block of data for printing lines 9 and 10. Similarly memory 107 is unloaded for printing the fifth and sixth lines of graphic data while memory 106 is reloaded with a block of data for printing lines 11 and 12, and memory 108 is unloaded for printing the seventh and eighth lines of graphic information while memory 107 is reloaded with a block of data for the thirteenth and fourteenth printing lines. Printing continues in this fashion until terminated by operation of a limit switch on plate 20 or unloading of an end-of-file code from tape unit 101.

For reading information from a graphic original the system may operate in either a line mode or a tone mode. In either mode digitizing of data is initiated by a microswitch (not shown) on platen 20 and terminated by a counter (not shown), which counts the number of steps made by stepping motor 43. Means may be provided for manually adjusting the count to which the counter proceeds before causing termination of the digitizing operation. An end-of-file mark may be written automatically or manually at the end of a complete scanning operation.

For scanning in the line mode a sample and hold unit 117 stores the values of optical density measured by photomultiplier 42 and a logarithmic amplifier 116. Data samples from sample and hold unit 117 are converted to digital form by analog to digital converter 118. The digital data from converter 118, which may be in the form of a six-bit digital words, is stored in a buffer 119.

The digital density levels stored in buffer 119 are transmitted to arithmetic comparator 130, which compares the density values with a threshold density, which may be manually set into threshold setting unit 129. The output from arithmetic comparator 130 is either a one or a zero depending upon whether the density value received from buffer 119 is higher or lower than the threshold setting. Sampling of data for comparison as aforesaid may occur at intervals of about 456 nanoseconds.

The single bit output signals from arithmetic comparator 130 are shifted into a shifter 131. After eight samples have been shifted into shifter 131, the entire eight bits are sent as an eight-bit word through multiplexer 126, buffer 127, multiplexer 103, and demultiplexer 104 for storage in memory 105. This process is repeated until two full lines have been scanned and stored in memory 105. At this time, demultiplexer 104 enables memory 106 and the data from the next two lines go to memory 106. Simultaneously, multiplexer 109 and demultiplexer 110 open a data path from memory 105 to tape unit 101 through buffer 128, and the contents of memory 105 are written on tape. At the end of the second pair of lines, the memories are again exchanged, so that tape unit 101 writes data from memory 106 and newly scanned data is stored in memory 105. Tapes so generated in the line mode may be used directly for printing as previously described.

For operation in the tone mode, the system averages density data observed in four-by-four matrices and writes the average value in digital form on magnetic tape. Data averaging is done in this manner so that the tones in the original image may be reproduced at the same scale by a dot matrix reproduction technique. Such tonal reproduction is described in detail in Behane et al U.S. Pat. No. 3,604,846. Tapes as so generated in the tonal mode may not be used directly for printing but must be further processed as taught by the Behane et al patent.

During operation in the tone mode arithmetic comparator 130 is not utilized, and digitized density data from buffer 119 is applied to adder 120 for addition to a digitized density level read out from buffer 122. For the first sample there is no output from buffer 122, and the data in adder 120 is cycled through buffer 121 and into buffer 122. This data, which represents the optical density level for the first observation, is added to the density level read out from buffer 119 for the second observation. After four samples have been added together, the sum thereof is supplied to adder 125 for addition of the output from zero/true element 124.

For the first scanning line the output from zero/true element 124 is zero, so that the data from buffer 121 passes unchanged through multiplexer 126, buffer 127, multiplexer 103, and demultiplexer 104 to memory 105 for storage. Zero/true element 124 is held at zero for the first scanning line, so that at the end of the first line memory 105 contains the values of 2160 four-dot averages.

When the second line is scanned, each four-dot sum is stored in buffer 121 as before, but now zero/true element 124 along with multiplexer 123 permits data in memory 105 to be read out to adder 125. Thus each four-dot sum from buffer 121 is added to the four-dot sum for a corresponding set of four dots in the preceding scan line by adder 125. For the second scan line the output from adder 125 is stored in memory 106, so that memory 106 contains the sums of summations over lines one and two.

When scanning line three, memory 106 is read out through zero/true element 124 to adder 125 and added to the four-dot sums read out from buffer 121. Such summations during line three are stored in memory 105, so that memory 105 now contains the sums for three lines. These three line sums are read out from memory 105 through zero/true element 124 during the fourth scan line for addition to the output from buffer 121. This addition, which produces summation over four lines, results in 2160 sixteen-bit sums which are stored in memory 106.

After the above mentioned sixteen-bit sums have been produced, they are read out from memory 106 through multiplexer 109 and demultiplexer 110 to buffer 128. The sums are in the form of eight-bit words which buffer 128 transmits to tape unit 101 for recording as indicated by the line 141.

While the bit sums for the first four lines are being written by tape unit 101, new bit sums for the next four lines are being generated in a manner similar to that for the first four lines. For generating the bit sums for the second four lines, memories 107 and 108 are utilized, with the final summation appearing in memory 108. The process continues repeatedly until the entire graphic original has been read. Each time the system begins reading a new set of four lines, zero/true element 124 is reset to zero and held at the zero level for one line. As stated above, the bit sums must be further processed before a suitable tape may be generated for printing by the system of this invention. The first step in such a tape preparation involves dividing each of the bit sums by sixteen in order to obtain sixteen-bit averages.

While the form of apparatus herein described constitues a preferred embodiment of the invention, it is to be understood that the invention is not limited to this precise form of apparatus, and that changes may be made therein without departing from the scope of the invention.

What is claimed is:

1. A combination printing and scanning system comprising:
   a. a laser for generating a linearly polarized beam of light,
   b. signal generating means for generating a series of binary signals representative of the information content of an image to be reproduced,
   c. beam deflection means for causing said beam of light to be directed selectively along one of two different paths in correspondence with the state of said binary signal,
   d. beam interception means for intercepting said beam when directed along one of said two different paths and permitting passage thereof when said beam is directed along the other of said paths,
   e. collimating means including first and second lenses for collimating said beam after passage by said interception means,
   f. support means for a graphic medium to be scanned or imaged,
   g. a third lens for focussing said collimated beam, directing said beam toward a point on said graphic medium, and collimating specular and diffused light reflected back from said point,
   h. scanning means for causing relative movement between said graphic medium and said point so that said point scans an entire working area within said graphic medium,
   i. polarizing means for circularly polarizing the collimated beam of light transmitted by said collimating means and linearly polarizing the circularly polarized specular light component of the light which is reflected back from said point and collimated by said lens means,
   j. filter means for filtering out from the collimated beam of light reflected back through said polarizing means the linearly polarized specular component thereof, k. focussing means for focussing the collimated beam of diffuse light passing through said filter means, l. a transducer placed at the image plane of said focussing means for generating an electrical signal related to the intensity of the focussed spot of diffuse light directed thereagainst, m. digitizing means for digitizing electrical signal and storing digital samples thereof, and n. selection means for selectively activating either said signal generating means and said beam deflection means or said digitizing means whereby said apparatus operates selectively either as a printing system or a scanning system.

2. Apparatus according to claim 1 wherein said signal generating means comprises a magnetic tape reading unit and means for causing said magnetic tape reading unit to read digitally coded graphic information from a magnetic tape in synchronism with the operation of said scanning means.

3. Apparatus according to claim 1 further comprising means for reading said digital samples out of storage, summing samples representing optical densities within two dimensional matrices upon an image on said graphic medium, and storing the summation of said samples.

4. Apparatus according to claim 3 further comprising threshold means for periodically sampling said electrical signal to determine whether or not said electrical signal is above a predetermined threshold and means for directing said electrical signal through said threshold means on a selective basis whereby said printing and scanning system can scan graphic information in either a line mode or a tone mode.

5. Apparatus according to claim 1 wherein said beam interception means comprises a plate provided with a pinhole aligned with one of said paths for passage of said beam when directed along said one of said paths.

6. Apparatus according to claim 5 wherein said support means comprises a cylindrically concave supporting surface for said substrate and further wherein said scanning means comprises means for moving said supporting surface in an axial direction and a circularly scanning mirror for scanning said point repetitively across said graphic medium.

7. Apparatus according to claim 6 wherein said first lens is positioned between said second lens and said aperture plate for focussing light emerging from said pinhole and said second lens is positioned at the image plane of said first lens for collimating the light so focussed.

8. Apparatus according to claim 7 wherein the distance between said first lens and said aperture plate is about 150 millimeters.

9. Apparatus according to claim 8 wherein said aperture plate has a thickness ranging between about 1 and 5 mils and said pinhole has a diameter in the order of about 16 mils.

* * * * *